(12) United States Patent
Ino

(10) Patent No.: US 10,102,882 B1
(45) Date of Patent: Oct. 16, 2018

(54) CAST BASE INCLUDING LOWER SURFACE STRUCTURE AND DISK DRIVE APPARATUS USING SAME

(71) Applicant: Nidec Corporation, Kyoto (JP)

(72) Inventor: Yasutaka Ino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/834,112

(22) Filed: Dec. 7, 2017

(30) Foreign Application Priority Data

Jun. 27, 2017 (JP) ................................ 2017-125401

(51) Int. Cl.
*G11B 33/02* (2006.01)
*G11B 33/12* (2006.01)
*G11B 5/48* (2006.01)

(52) U.S. Cl.
CPC .......... *G11B 33/022* (2013.01); *G11B 5/4813* (2013.01); *G11B 33/122* (2013.01)

(58) Field of Classification Search
None
See application file for complete search history.

(56) References Cited

U.S. PATENT DOCUMENTS

| 5,666,239 | A | * | 9/1997 | Pottebaum | G11B 25/043 360/99.23 |
| 6,510,021 | B1 | * | 1/2003 | Woldemar et al. | G11B 33/08 360/99.24 |
| 2014/0301175 | A1 | * | 10/2014 | Choi et al. | G11B 25/043 369/75.11 |
| 2016/0163349 | A1 | * | 6/2016 | Yawata et al. | G11B 19/2009 369/258.1 |

FOREIGN PATENT DOCUMENTS

JP 2015-127064 A 7/2015

* cited by examiner

*Primary Examiner* — Craig A. Renner
(74) *Attorney, Agent, or Firm* — Keating & Bennett, LLP

(57) ABSTRACT

A base of a disk drive apparatus includes a bottom plate portion, a pivot post, and a recessed portion. A lower surface of the bottom plate portion includes a first lower surface and a second lower surface. The first lower surface is arranged to extend perpendicularly to the first and second axes on a side of the recessed portion on which the first axis lies. The second lower surface is arranged to extend perpendicularly to the first and second axes on an opposite side of the recessed portion with respect to the first axis and at a level higher than that of the first lower surface. The first lower surface includes a projecting portion arranged adjacent to the recessed portion, and arranged to project in a direction away from the first axis.

10 Claims, 5 Drawing Sheets

CAST BASE INCLUDING LOWER SURFACE STRUCTURE AND DISK DRIVE APPARATUS USING SAME

CROSS REFERENCE TO RELATED APPLICATIONS

This application claims the benefit of priority to Japanese Patent Application No. 2017-125401 filed on Jun. 27, 2017. The entire contents of this application are hereby incorporated herein by reference.

BACKGROUND OF THE INVENTION

1. Field of the Invention

The present invention relates to a base and a disk drive apparatus.

2. Description of the Related Art

A disk drive apparatus, such as, for example, a hard disk drive, has been known. The disk drive apparatus typically includes a spindle motor arranged to rotate a disk, a head arranged to perform reading and writing of information from or to the disk, and a base arranged to support the spindle motor and the head. A known base for use in a disk drive apparatus is described in, for example, JP-A 2015-127064. The base described in JP-A 2015-127064 is defined by forging.

Like the base described in JP-A 2015-127064, a base produced by forging has a high strength. However, forging takes much time, and is not suitable for mass production. Accordingly, there has been a demand to manufacture a base having a high strength using casting, which provides a higher productivity than forging. However, the base typically includes a pin-shaped pivot post arranged to support a head such that the head is capable of swinging. When the base is manufactured by casting, it is necessary to define the pivot post with high accuracy. In addition, a base end portion of the pivot post and its vicinity need to have a sufficient strength to withstand the swing of the head.

SUMMARY OF THE INVENTION

A base according to a preferred embodiment of the present invention is a casting and is used in a disk drive apparatus. The base includes a bottom plate portion arranged to extend perpendicularly to a first axis and a second axis, the first axis extending in a vertical direction and being a rotation axis of a disk, the second axis extending in the vertical direction at a position different from that of the first axis and being a pivot axis of a head used to perform at least one of reading and writing of information from or to the disk; a pivot post arranged to project upward from an upper surface of the bottom plate portion at a position overlapping with the second axis; and a recessed portion recessed upward from a lower surface of the bottom plate portion at the position overlapping with the second axis. The lower surface of the bottom plate portion includes a first lower surface arranged to extend perpendicularly to the first and second axes on a side of the recessed portion on which the first axis lies; and a second lower surface arranged to extend perpendicularly to the first and second axes on an opposite side of the recessed portion with respect to the first axis and at a level higher than that of the first lower surface. The first lower surface includes at least one projecting portion arranged adjacent to the recessed portion, and arranged to project in a direction away from the first axis.

According to the above preferred embodiment of the present invention, provision of the recessed portion facilitates a flow of a molten metal into the pivot post when the base is cast. This allows the pivot post to be defined with high accuracy. In addition, provision of the at least one projecting portion adjacent to the recessed portion reduces a reduction in rigidity of a base end portion of the pivot post and its vicinity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a rotation axis of a disk is referred to as a "first axis", and a pivot axis of a head is referred to as a "second axis". The first and second axes extend in parallel with each other at different positions. It is also assumed herein that a direction parallel to both the first and second axes is referred to by the term "axial direction", "axial", or "axially", that directions perpendicular to the first axis are each referred to by the term "radial direction", "radial", or "radially", and that a direction along a circular arc centered on the first axis is referred to by the term "circumferential direction", "circumferential", or "circumferentially". It is also assumed herein that an axial direction is a vertical direction, and that a side on which a cover is arranged with respect to a base is an upper side, and the shape of each member or portion and relative positions of different members or portions will be described based on the above assumptions. It should be noted, however, that the above definitions of the vertical direction and the upper and lower sides are not meant to restrict in any way the orientation of a base or a disk drive apparatus according to any preferred embodiment of the present invention when in use.

1. Structure of Disk Drive Apparatus

Figure 1:
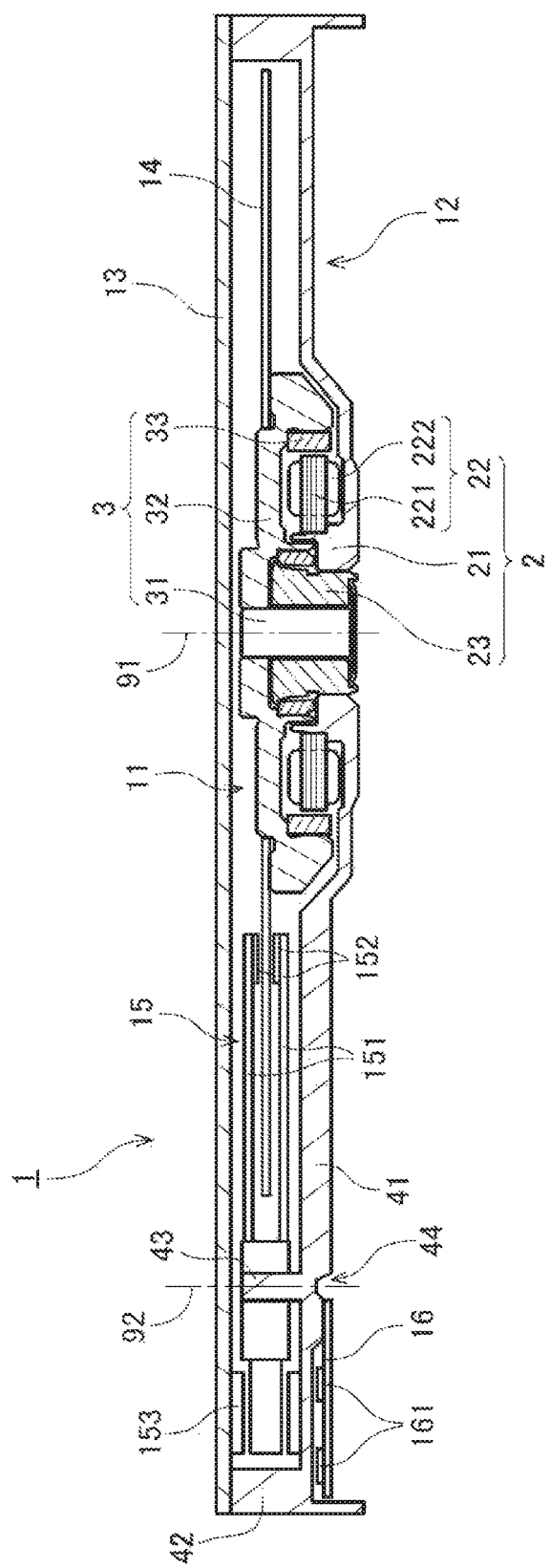
FIG. 1 is a vertical sectional view of a disk drive apparatus according to a preferred embodiment of the present invention.

FIG. 1 is a vertical sectional view of a disk drive apparatus 1 according to a preferred embodiment of the present invention.

The disk drive apparatus 1 is an apparatus arranged to perform reading and writing of information from or to a disk-shaped magnetic disk 14 including a circular hole in a center thereof while rotating the magnetic disk 14. Referring to FIG. 1, the disk drive apparatus 1 includes a spindle motor 11, a base 12, a cover 13, the magnetic disk 14, an access portion 15, and a circuit board 16.

The spindle motor 11 is a device arranged to rotate the magnetic disk 14 about a first axis 91 while supporting the magnetic disk 14. The spindle motor 11 includes a stationary portion 2 and a rotating portion 3. The stationary portion 2 is arranged to be stationary relative to both the base 12 and the cover 13. The rotating portion 3 is supported to be rotatable with respect to the stationary portion 2.

The stationary portion 2 includes a stator support portion 21, a stator 22, and a bearing unit 23. The stator support portion 21 is arranged to extend in an axial direction to assume a cylindrical shape around the first axis 91. The stator support portion 21 defines a portion of the spindle motor 11 and a portion of the base 12. The stator 22 includes a stator core 221, which is a magnetic body, and a plurality of coils 222. The stator core 221 is fixed to an outer circumferential surface of the stator support portion 21. The stator core 221 includes a plurality of teeth arranged to project radially outward. Each of the coils 222 is defined by a conducting wire wound around a separate one of the teeth. The bearing unit 23 is fixed to an inner circumferential surface of the stator support portion 21. The bearing unit 23 is arranged to rotatably support a shaft 31, which is included in the rotating portion 3. A fluid dynamic bearing mechanism, for example, is used as the bearing unit 23.

The rotating portion 3 includes the shaft 31, a hub 32, and a rotor magnet 33. The shaft 31 is a columnar member arranged to extend along the first axis 91. A lower end portion of the shaft 31 is accommodated inside of the bearing unit 23. The hub 32 is arranged to extend radially outward from a peripheral portion of an upper end portion of the shaft 31. The magnetic disk 14 is fixed to the hub 32 while being oriented perpendicular to the first axis 91. The rotor magnet 33 is fixed to the hub 32 radially outside of the stator 22. A magnet in the shape of a circular ring, for example, is used as the rotor magnet 33. An inner circumferential surface of the rotor magnet 33 includes north and south poles arranged to alternate with each other in a circumferential direction.

Once electric drive currents are supplied to the coils 222 in the spindle motor 11 as described above, magnetic flux is generated around each of the teeth of the stator core 221. Then, a circumferential torque is produced by interaction between the magnetic flux of the teeth and that of the rotor magnet 33, so that the rotating portion 3 is caused to rotate about the first axis 91 with respect to the stationary portion 2. The rotation of the rotating portion 3 causes the magnetic disk 14, which is supported by the hub 32, to rotate about the first axis 91.

The base 12 is a substantially plate-shaped member arranged to support the spindle motor 11 and the access portion 15. The base 12 is a so-called casting obtained by pouring a metal into a mold and hardening the metal therein. Aluminum or an aluminum alloy, for example, is used as the metal material of the base 12.

Figure 2:
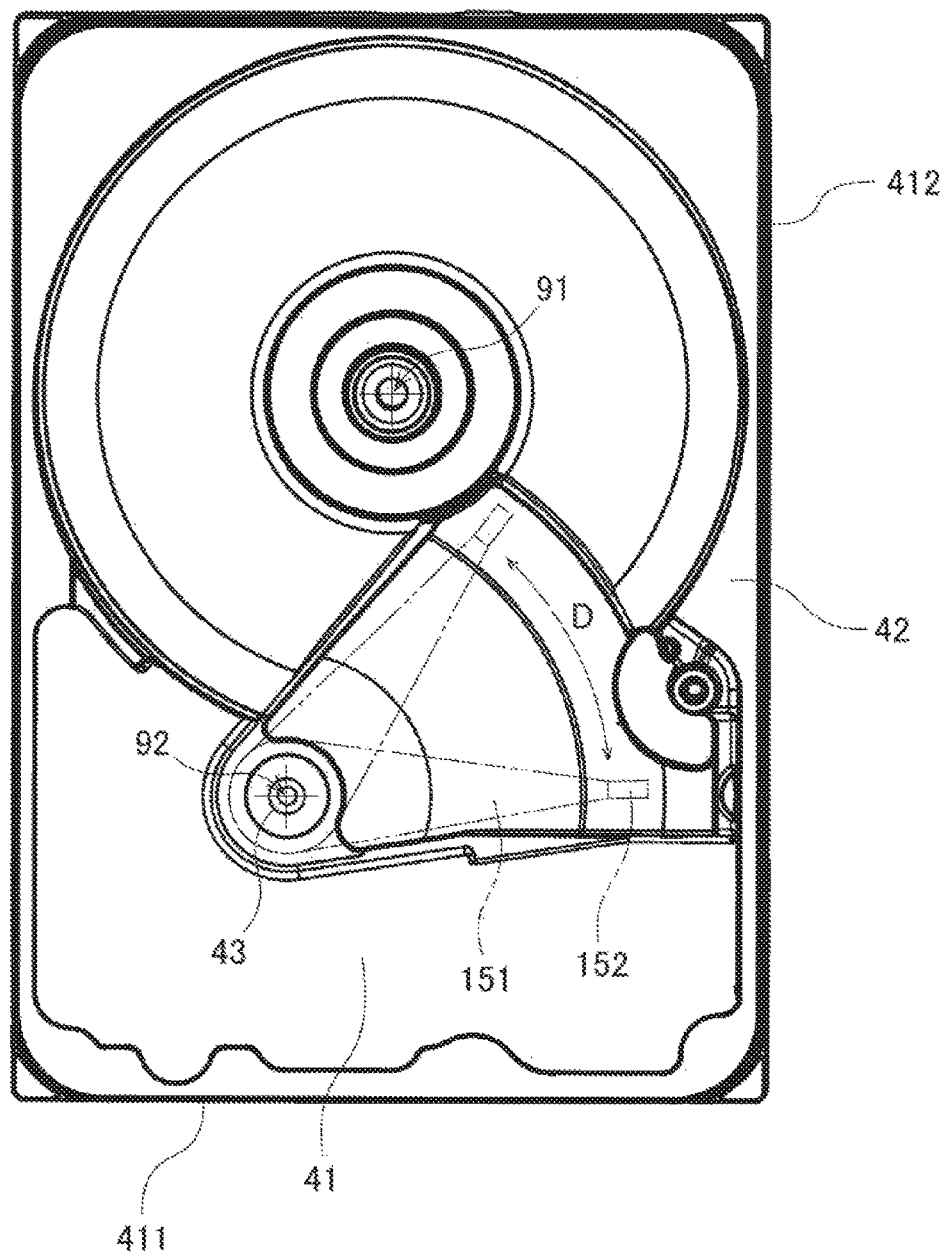
FIG. 2 is a top view of a base according to a preferred embodiment of the present invention.
Figure 3:
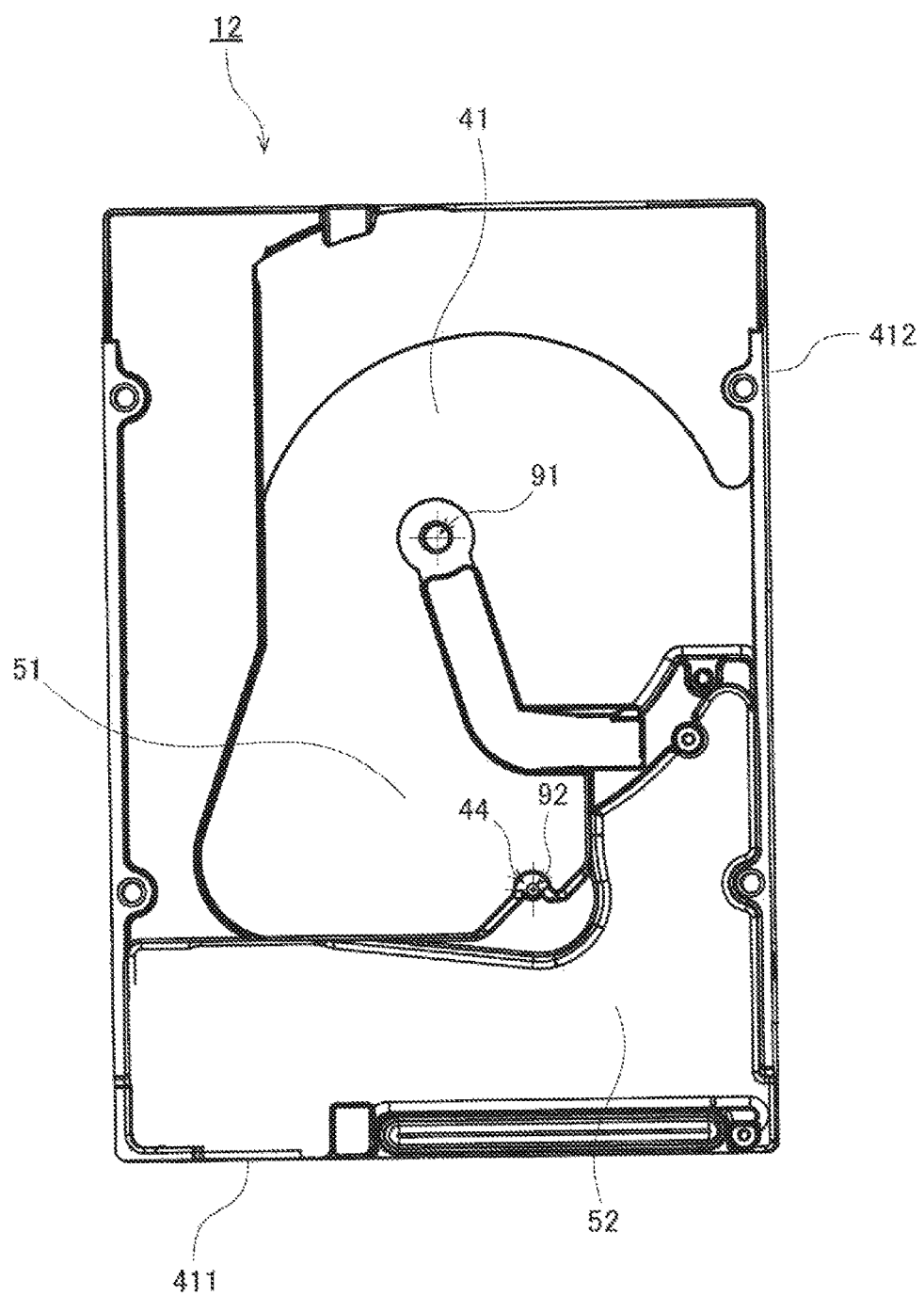
FIG. 3 is a bottom view of the base according to a preferred embodiment of the present invention.

FIG. 2 is a top view of the base 12. FIG. 3 is a bottom view of the base 12. Referring to FIGS. 1 to 3, the base 12 includes the aforementioned stator support portion 21, a bottom plate portion 41, a side wall portion 42, and a pivot post 43. The bottom plate portion 41 is arranged to extend perpendicularly to the first axis 91 and a second axis 92 below the rotating portion 3 of the spindle motor 11, the magnetic disk 14, and the access portion 15. The bottom plate portion 41 is rectangular in a plan view. A lower end portion of the stator support portion 21 and the bottom plate portion 41 are continuous with each other. The side wall portion 42 is a rectangular and tubular portion arranged to extend upward from an outer edge of the bottom plate portion 41. The pivot post 43 is a columnar portion arranged to project upward from an upper surface of the bottom plate portion 41 at a position overlapping with the second axis 92.

The shape of the base 12 will be described in more detail below.

The cover 13 is supported by an upper end surface of the side wall portion 42 of the base 12. An upper opening of the base 12 is closed by the cover 13. The base 12 and the cover 13 are fixed to each other through, for example, screws. The rotating portion 3 of the spindle motor 11, the magnetic disk 14, and the access portion 15 are housed in a casing defined by the base 12 and the cover 13.

The access portion 15 includes arms 151, heads 152 arranged at tips of the arms 151, and an actuator mechanism 153. Each arm 151 is attached to the pivot post 43 of the base 12 through a bearing. The actuator mechanism 153 is a mechanism to cause each of the arms 151 and the heads 152 to swing. Once the actuator mechanism 153 is driven, the arm 151 is caused to swing on the second axis 92. The head 152 is thus arranged to move along a recording surface of the magnetic disk 14. The heads 152 are arranged opposite to an upper surface and a lower surface of the magnetic disk 14, and are arranged to perform reading and writing of information from or to the magnetic disk 14.

Note that each head 152 may alternatively be arranged to perform only one of the reading and the writing of information from or to the magnetic disk 14. Also note that the disk drive apparatus 1 may alternatively be arranged to include two or more magnetic disks 14. Also note that the disk drive apparatus 1 may alternatively be an apparatus arranged to rotate an optical disk.

The circuit board 16 is fixed to a lower surface of the bottom plate portion 41 of the base 12. A so-called rigid board, which has a small degree of flexibility, for example, is used as the circuit board 16. An electrical circuit needed for an operation of the disk drive apparatus 1 is mounted on the circuit board 16. The electrical circuit may be a circuit for an operation of the spindle motor 11, a circuit for an operation of the actuator mechanism 153, or a circuit for detecting various signals. A plurality of electronic components 161 used to form the electrical circuit are mounted on an upper surface of the circuit board 16. The circuit board 16 is connected to the coils 222 of the spindle motor 11 through a so-called flexible printed circuit board (not shown), which is highly flexible.

2. Detailed Shape of Base

Next, the detailed shape of the base 12 will now be described below.

Referring to FIGS. 1 and 3, the base 12 includes a recessed portion 44 at a position overlapping with the second axis 92. The recessed portion 44 is recessed upward from the lower surface of the bottom plate portion 41 at a position under the pivot post 43. The recessed portion 44 according to the present preferred embodiment is a recess in the shape of a truncated cone. That is, the recessed portion 44 is circular in a bottom plan view. In addition, the recessed portion 44 has an inside diameter gradually decreasing in an axially upward direction.

Figure 4:
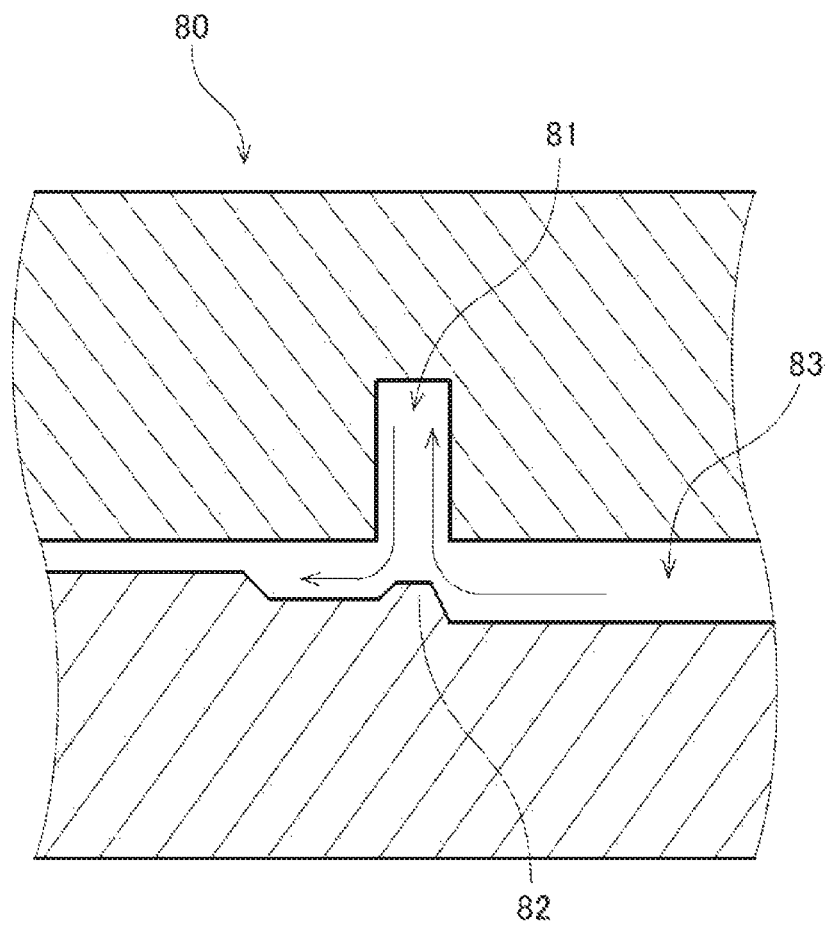
FIG. 4 is a partial sectional view of a mold used to cast the base according to a preferred embodiment of the present invention.

The recessed portion 44 serves to facilitate a flow of a molten metal into the pivot post 43 when the base 12 is cast. FIG. 4 is a partial vertical sectional view of a mold 80 used to cast the base 12. FIG. 4 represents a section of the mold 80 taken along a line extending in a longitudinal direction, which will be described below, and passing through a position corresponding to the recessed portion 44. As illustrated in FIG. 4, the mold 80 includes a depression 81 for defining the pivot post 43, and a projection 82 for defining the recessed portion 44. When the base 12 is cast, the molten metal is poured into a cavity 83 in the mold 80. At this time, a flow of the molten metal toward the projection 82 strikes a surface of the projection 82 and is turned upward as indicated by an arrow in FIG. 4. This facilitates a flow of the molten metal into the depression 81. The pivot post 43 can thus be defined with high accuracy.

In addition, as illustrated in FIG. 3, the lower surface of the bottom plate portion 41 includes a first lower surface 51 and a second lower surface 52. The first lower surface 51 is arranged on a side of the recessed portion 44 on which the first axis 91 lies. In addition, the first lower surface 51 is arranged to extend perpendicularly to the first and second axes 91 and 92. The second lower surface 52 is arranged on an opposite side of the recessed portion 44 with respect to the first axis 91. In addition, the second lower surface 52 is arranged to extend perpendicularly to the first and second axes 91 and 92 at a level higher than that of the first lower surface 51. The circuit board 16 is arranged on the second lower surface 52.

The second lower surface 52 is at a level higher than that of the first lower surface 51. That is, the second lower surface 52 is recessed relative to the first lower surface 51 when the base 12 is viewed from the lower side thereof. At least a portion of the circuit board 16 is accommodated in this recessed space. This prevents or reduces a protrusion of the circuit board 16 below the first lower surface 51.

Figure 5:
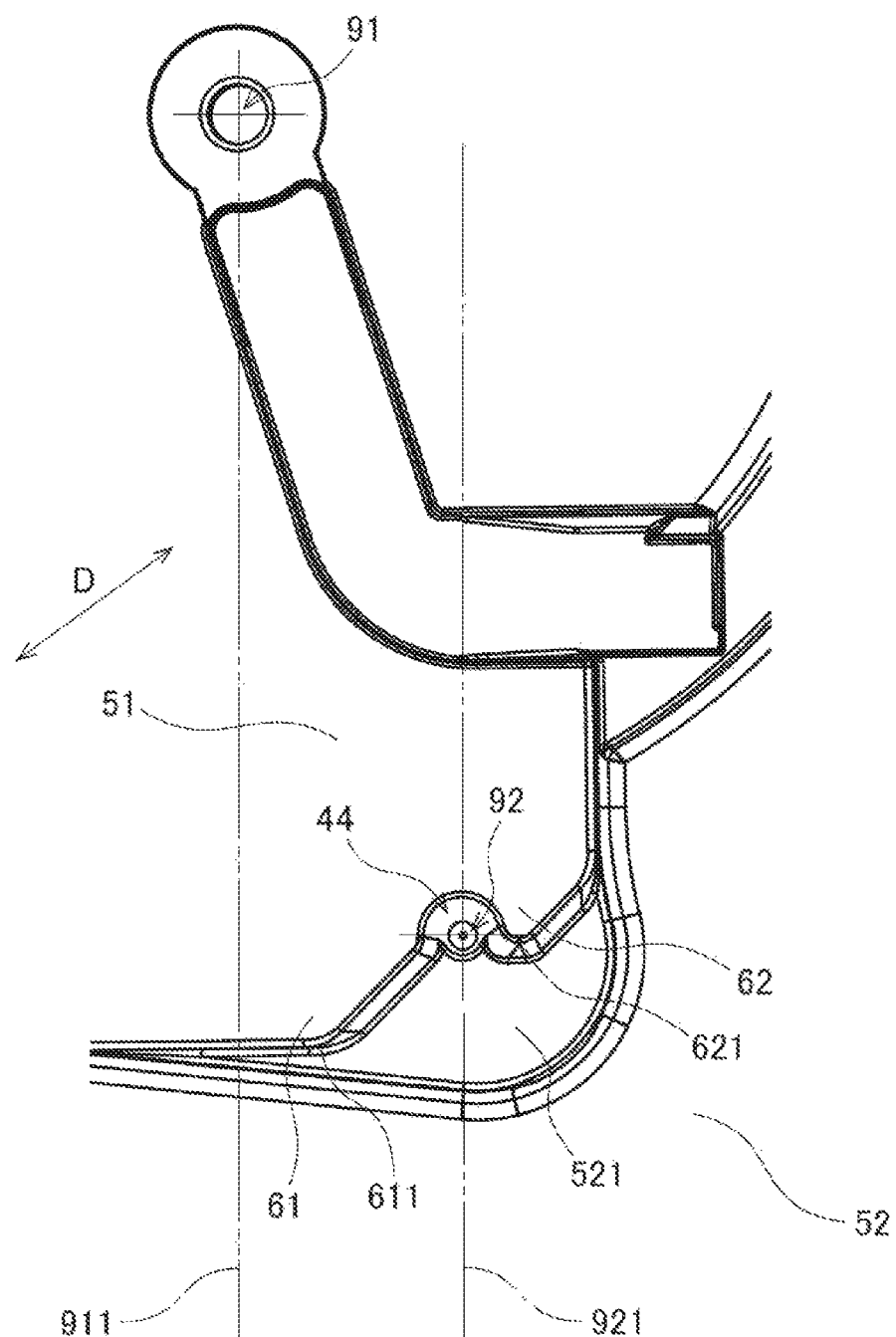
FIG. 5 is a partial bottom view of the base according to a preferred embodiment of the present invention.

FIG. 5 is a partial bottom view of the base 12. Referring to FIG. 5, the first lower surface 51 includes a first projecting portion 61 and a second projecting portion 62. Each of the first and second projecting portions 61 and 62 is arranged adjacent to the recessed portion 44. In addition, each of the first and second projecting portions 61 and 62 is arranged to project in a direction away from the first axis 91. As noted above, provision of the recessed portion 44 allows the pivot post 43 to be defined with high accuracy. However, the provision of the recessed portion 44 results in a corresponding reduction in a thickness of the bottom plate portion 41. However, the base 12 according to the present preferred embodiment includes the first and second projecting portions 61 and 62 at positions adjacent to the recessed portion 44. This results in an increased thickness of the bottom plate portion 41 near the recessed portion 44, reducing a reduction in rigidity of a vicinity of the recessed portion 44.

In particular, in the present preferred embodiment, half or more than half a circumference of the recessed portion 44 is enclosed by the first lower surface 51 including the first and second projecting portions 61 and 62. This results in an additional reduction in the reduction in the rigidity of the vicinity of the recessed portion 44.

Referring to FIGS. 2 and 3, the bottom plate portion 41 according to the present preferred embodiment is rectangular and has short sides 411 and long sides 412. A direction parallel to the short sides 411 of the bottom plate portion 41 will be hereinafter referred to as a "widthwise direction". In addition, a direction parallel to the long sides 412 of the bottom plate portion 41 will be hereinafter referred to as the "longitudinal direction".

In the widthwise direction, the first projecting portion 61 is arranged on a side of the recessed portion 44 on which the first axis 91 lies. In addition, the first projecting portion 61 is arranged to project in the longitudinal direction away from the first axis 91. In the widthwise direction, the second projecting portion 62 is arranged on an opposite side of the recessed portion 44 with respect to the first axis 91. In addition, the second projecting portion 62 is arranged to project in the longitudinal direction away from the first axis 91. Thus, in the present preferred embodiment, the first and second projecting portions 61 and 62 are arranged on opposite sides of the recessed portion 44 in the widthwise direction. This leads to an additional reduction in the reduction in the rigidity of the vicinity of the recessed portion 44.

Referring to FIG. 5, the first projecting portion 61 includes a first top portion 611. The first top portion 611 is a portion of the first projecting portion 61 that is farthest from the first axis 91. A distance from the first axis 91 to the first top portion 611 is longer than a distance from the first axis 91 to the second axis 92. In addition, referring to FIG. 5, the second projecting portion 62 includes a second top portion 621. The second top portion 621 is a portion of the second projecting portion 62 that is farthest from the first axis 91. A distance from the first axis 91 to the second top portion 621 is longer than the distance from the first axis 91 to the second axis 92.

Thus, each of the first top portion 611 of the first projecting portion 61 and the second top portion 621 of the second projecting portion 62 is arranged to project to a sufficient extent to more effectively reduce the reduction in the rigidity of the vicinity of the recessed portion 44.

Here, an excessive distance of the position of the first top portion 611 from the recessed portion 44 in the widthwise direction would hinder the first top portion 611 from contributing to the rigidity of the vicinity of the recessed portion 44. However, in the present preferred embodiment, as illustrated in FIG. 5, the first top portion 611 is arranged between a first imaginary line 911 parallel to the long sides 412 and passing through the first axis 91 and a second imaginary line 921 parallel to the long sides 412 and passing through the second axis 92. The first top portion 611 is thus arranged close to the recessed portion 44 to achieve an additional reduction in the reduction in the rigidity of the vicinity of the recessed portion 44.

The arms 151 and the heads 152 of the access portion 15 swing in a swing direction D indicated by an arrow in FIGS. 2 and 5. At this time, the pivot post 43 receives an inertial force acting in the swing direction D. Therefore, a lower end portion of the pivot post 43 and its vicinity (i.e., the vicinity of the recessed portion 44) need to have a sufficient rigidity to resist the inertial force acting in the swing direction D. In the present preferred embodiment, the first projecting portion 61 is arranged to project farther in the longitudinal direction than the second projecting portion 62. That is, a distance from the first axis 91 to the first top portion 611 in the longitudinal direction is longer than a distance from the first axis 91 to the second top portion 621 in the longitudinal direction. As a result, the first and second projecting portions 61 and 62 are arranged in parallel with the swing direction D. This contributes to more effectively preventing the inertial force from causing a deformation of the pivot post 43 or the bottom plate portion 41. This in turn contributes to allowing each head 152 to swing with higher accuracy.

In addition, as illustrated in FIG. 5, the second lower surface 52 according to the present preferred embodiment includes a stand portion 521. The stand portion 521 is arranged to project downward relative to a remaining portion of the second lower surface 52. The stand portion 521 is arranged at a level higher than that of the first lower surface 51 and lower than that of the remaining portion of the second lower surface 52 excluding the stand portion 521.

A portion of the upper surface of the circuit board 16 is arranged to be in contact with the stand portion 521. The circuit board 16 is thus axially positioned. The electronic components 161 mounted on the upper surface of the circuit board 16 are accommodated in a space between the circuit board 16 and the remaining portion of the second lower surface 52 excluding the stand portion 521.

In the present preferred embodiment, the stand portion 521 as described above is arranged at a position adjacent to the recessed portion 44 and the first and second projecting portions 61 and 62. The provision of the stand portion 521 in the vicinity of the recessed portion 44 results in an additional increase in the rigidity of the vicinity of the recessed portion 44.

3. Example Modifications

While a preferred embodiment of the present invention has been described above, it will be understood that the present invention is not limited to the above-described preferred embodiment.

In the above-described preferred embodiment, two projecting portions, i.e., the first and second projecting portions 61 and 62, are defined in the lower surface of the base 12. Note, however, that the number of such projecting portions defined in the lower surface of the base 12 may alternatively be one. For example, such a projecting portion may be defined on only one side of the recessed portion 44 in the widthwise direction. Also note that such a projecting portion may not necessarily be arranged to project in the longitudinal direction. Also note that the shape of such a projecting portion may be different from the shapes of the first and second projecting portions 61 and 62 as illustrated in the accompanying drawings of the present application.

Also note that a spindle motor included in a disk drive apparatus according to a preferred embodiment of the present invention may have a structure different from that of the spindle motor 11 according to the above-described preferred embodiment. For example, a spindle motor included in a disk drive apparatus according to a preferred embodiment of the present invention may be a spindle motor of a so-called fixed-shaft type, in which a hub is arranged to rotate about a stationary shaft.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, bases and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base being a casting and used in a disk drive apparatus, the base comprising:
   a bottom plate portion that extends perpendicularly to a first axis and a second axis, the first axis extending in a vertical direction and being a rotation axis of a disk, the second axis extending in the vertical direction at a position different from that of the first axis and being a pivot axis of a head used to perform at least one of reading and writing of information from or to the disk;
   a pivot post that projects axially upward from an upper surface of the bottom plate portion at a position overlapping with the second axis; and
   a recessed portion recessed axially upward from a lower surface of the bottom plate portion at the position overlapping with the second axis; wherein
   the lower surface of the bottom plate portion includes:
      a first lower surface that extends perpendicularly to the first and second axes on a side of the recessed portion on which the first axis lies; and
      a second lower surface that extends perpendicularly to the first and second axes on an opposite side of the recessed portion with respect to the first axis and at an axial level higher than that of the first lower surface;
   the first lower surface includes at least one projecting portion arranged adjacent to the recessed portion, and arranged to project in a direction radially away from the first axis; and
   the base is defined by a single monolithic piece of material.

2. The base according to claim 1, wherein half or more than half a circumference of the recessed portion is enclosed by the first lower surface including the at least one projecting portion.

3. The base according to claim 1, wherein
   the bottom plate portion is rectangular and includes short sides and long sides; and
   the at least one projecting portion includes:
      a first projecting portion on a side of the recessed portion on which the first axis lies in a widthwise direction of the bottom plate portion; and
      a second projecting portion on an opposite side of the recessed portion with respect to the first axis in the widthwise direction of the bottom plate portion.

4. The base according to claim 3, wherein
   the first projecting portion includes a first top portion farthest from the first axis in the first projecting portion; and
   a distance from the first axis to the first top portion is longer than a distance from the first axis to the second axis.

5. The base according to claim 4, wherein the first top portion is arranged between a first imaginary line parallel to the long sides and passing through the first axis and a second imaginary line parallel to the long sides and passing through the second axis.

6. The base according to claim 3, wherein
   the second projecting portion includes a second top portion farthest from the first axis in the second projecting portion; and
   a distance from the first axis to the second top portion is longer than a distance from the first axis to the second axis.

7. The base according to claim 3, wherein the first and second projecting portions are arranged in parallel with a swing direction of the head.

8. The base according to claim 1, wherein the second lower surface includes a stand portion that projects downward at a position adjacent to both the recessed portion and the at least one projecting portion.

9. The base according to claim 1, wherein the second lower surface is a surface on which a circuit board is to be arranged.

10. A disk drive apparatus comprising:
the base of claim 9;
a motor that rotates the disk about the first axis;
the head; and
an actuator mechanism that swings the head on the second axis.

* * * * *